(12) United States Patent
Diels et al.

(10) Patent No.: US 8,488,639 B1
(45) Date of Patent: Jul. 16, 2013

(54) SYSTEMS AND METHODS HAVING A FREQUENCY COMB

(75) Inventors: Jean-Claude Diels, Albuquerque, NM (US); Ladan Arissian, Albuquerque, NM (US)

(73) Assignee: STC.UNM, Albuquerque, NM (US)

(*) Notice: Subject to any disclaimer, the term of this patent is extended or adjusted under 35 U.S.C. 154(b) by 432 days.

(21) Appl. No.: 12/699,566

(22) Filed: Feb. 3, 2010

Related U.S. Application Data

(60) Provisional application No. 61/206,801, filed on Feb. 4, 2009.

(51) Int. Cl.
*H01S 3/10* (2006.01)

(52) U.S. Cl.
USPC ........ 372/28; 372/5; 372/13; 372/18; 372/25; 372/26; 372/38.02

(58) Field of Classification Search
USPC ............... 372/13, 18, 25, 28, 38.02, 5, 26
See application file for complete search history.

(56) References Cited

U.S. PATENT DOCUMENTS

| | | | |
|---|---|---|---|
| 7,508,851 B2 * | 3/2009 | Yoshitomi et al. | 372/25 |
| 7,664,149 B2 | 2/2010 | Diels et al. | |
| 7,953,131 B2 * | 5/2011 | Park et al. | 372/28 |
| 7,995,630 B2 * | 8/2011 | Rakuljic | 372/29.011 |
| 2003/0231601 A1 * | 12/2003 | Kim | 370/277 |
| 2004/0264977 A1 * | 12/2004 | Yap et al. | 398/161 |
| 2005/0018724 A1 * | 1/2005 | Da Silva et al. | 372/32 |
| 2007/0091941 A1 * | 4/2007 | Mori et al. | 372/18 |
| 2009/0225795 A1 * | 9/2009 | Park et al. | 372/18 |
| 2009/0245306 A1 * | 10/2009 | Rakuljic | 372/29.011 |
| 2011/0122912 A1 * | 5/2011 | Benjamin et al. | 372/50.124 |
| 2012/0002972 A1 * | 1/2012 | Stiffler et al. | 398/115 |

FOREIGN PATENT DOCUMENTS

WO   WO2008044839   * 4/2008

OTHER PUBLICATIONS

S. A. Meyer, "Diode-pumped Yb:KYW femtosecond laser frequency comb with stabilized carrier-envelope offset frequency" The Europian Physical Journal D (2008) pp. 1-8.*

Ladan Arissian et al. "Progress towards a hing frequency comb with mode-locked lasers and sensor applications" Laser Resonator and Beam Control VI (2003), pp. 1-10.*

Arissian, Ladan, et al., "Investigation of carrier to envelope phase and repetition rate: fingerprints of mode-locked laser cavities", Journal of Physics B: Atomic, Molecular and Optical Physics 42 (2009) 183001, (2009), 1-25.

Agrawal, Govind P., "Chapter 9: Nonlinear Fiber Optics", Nonlinear Science at the Dawn of the 21st Century, (2000), 195-211.

(Continued)

*Primary Examiner* — Jessica Stultz
*Assistant Examiner* — Delma R Forde
(74) *Attorney, Agent, or Firm* — Schwegman Lundberg & Woessner, P.A.

(57) ABSTRACT

Apparatus, systems, and methods having a frequency comb of large spacing can be used in a variety of applications. In various embodiments, a frequency comb is generated from a slave laser by injecting an optical output from a drive laser into the slave laser. One or more parameters of the drive laser and/or the slave laser can be adjusted such that a frequency comb can be generated at a multiple of the repetition rate of the drive laser. Additional apparatus, systems, and methods are disclosed.

23 Claims, 3 Drawing Sheets

OTHER PUBLICATIONS

Alipieva, E, et al., "Narrow structure in the coherent population trapping resonance in rubidium", Optic Letters, 28, (2003), 1817-19.
Alzetta, G, et al., "An experimental method for the observation of the RF transitions and laser beat resonances in oriented Na vapour", N. Cimento, 36, (1976), 5-20.
Arimondo, E, "Coherent population trapping in laser spectroscopy", Progress in Optics XXXV, In, E.Wolf (editor), (1996), 257-354.
Arimondo, E, et al., "Nonabsorbing Atomic Coherences by Coherent Two-Photon Transitions in a Three-Level Optical Pubping", Lettere al Nuovo Cimento vol. 17, N. 10, (Nov. 1976), 333-339.
Arimondo, Ennio, "Relaxation processes in coherent-population trapping", Physical Review A vol. 54, No. 3, (Sep. 1996), 2216-2223.
Arissian, L., et al., "Multiple quantum wells for ring and linear lasers with long lifetime gain", Solid State Lasers XIV: Technology and Devices, Proceedings of the SPIE, vol. 5707, (2005), 295-301.
Arissian, Ladan, et al., "Carrier to envelope and dispersion control in a cavity with prism pairs", Physical Review A 75, (2007), 013814:1-9.
Arissian, Ladan, "Differential beat note interferometry in linear lasers with two pulses/cavity round-trip", Photonics North IEEE, Diels Research Group, (2008), 21 pgs.
Bohn, Matthew J, et al., "Measuring intracavity phase changes by use of double pulses in a linear cavity", Optics Letters, 22(9), (1997), 642-44.
Bohn, Matthew J, et al., "Mutual Kerr-lens mode-locking", Optic Communications 170, (Oct. 1999), 85-92.
Bouchiat, M, "Relaxation of Optically Pumped Rb Atoms on Paraffin-Coated Walls", Phys. Rev. 147, Issue 1, (Jul. 1996), 41-54.
Brabec, T, et al., "Limits of pulse shortening in solitary lasers", Optics Letters vol. 17, No. 10, (May 1992), 748-750.
Brandt, S, et al., "Buffer-gas-induced linewidth reduction of coherent dark resonances to below 50 Hz", Phys. Rev. A 56, Issue 2, (Aug. 1997), R1063-R1066.
Corkum, P. B, et al., "Plasma Perspective on Strong-field Multiphoton Ionization", Physical Review Letters vol. 71, No. 13, (Sep. 1993), 1994-1997.
Cyr, N, et al., "All-Optical Microwave Frequency Standard:. A Proposal", Instrumentation and Measurement, IEEE Transactions on vol. 42, Issue 2, (Apr. 1993), 640-649.
Dennis, Michael L, et al., "Femtosecond ring dye laser: a potential new laser gyro", Optics Letters, 16(7), (Apr. 1991), 529-531.
Diddams, Scott, et al., "Differential intracavity phase spectroscopy of a three-level system in samarium", Phys Rev A, 58, (1998), 2252-64.
Diddams, Scott A, et al., "Molecular fingerprinting with the resolved modes of a femtosecond laser frequency comb", Nature Letters vol. 445, (Feb. 2007), 627-630.
Diels, J. C, et al., "Chapter 12: Applications of Ultrafast Lasers: Sensors of extreme sensitivity", Femtosecond Optical Frequency Comb : Principle, Operation, and Applications, New York, NY : Springer; Jun Ye and Steven Cundiff, Eds., (2005), 333-54.
Eckstein, J. N, et al., "High-Resolution Two-Photon Spectroscopy with Picosecond Light Pulses", Physical Review Letters vol. 40, Iss. 13, (Mar. 1978), 4 pgs.
Erhard, M, et al., "Power broadening and Doppler effects of coherent dark resonances in Rb", Phys. Rev. A 62, Issue 6, (Nov. 2000), 4 pgs.
Foot, C. J., et al., "Continuous-Wave Two-Photon Spectroscopy of the 1S-2S Transition in Hydrogen", Physical Review Letters vol. 54, No. 17, (Apr. 1985), 1913-1916.
Fortier, Tara, et al., "Long-term carrier-envelope phase coherence", Optics Letters vol. 27, No. 16, (Aug. 2002), 1436-1438.
Hall, J, et al., "Optical frequency standards and measurement", Instrumentation and Measurement, IEEE Transactions on vol. 52, Issue 2, (Apr. 2003), 227-231.
Harris, S. E., et al., "Electromagnetically Induced Trasparency in an Ideal Plasma", Physical Review Letters, (Dec. 1996), 5357-5360.
Hentschel, M, et al., "Attosecond Metrology", Nature vol. 414, (Nov. 2001), 509-513.
Kartner, F. X., et al., "Design and fabrication of double-chirped mirrors", Optics Letters vol. 22, No. 11, (Jun. 1997), 831-833.
Knappe, "Characterization of coherent population-trapping resonances as atomic frequency references", Journal of the Optical Society of America, B(18)vol. 18, Issue 11, (2001), 1545-1553.
Lai, Ming, et al., "Wave-particle duality of a photon in emission", J. Opt. Soc. Am. vol. 9, No. 12, (Dec. 1992), 2290-2294.
Lukin, M D, et al., "Spectroscopy in Dense Coherent Media: Line Narrowing and Interference Effects", Phys Rev Lett. 79, (1997), 2959-62.
Maker, P. D, et al., "Optical Third Harmonic Generation", Quantum Electronics. Proc. 3rd Int., (1964), 1559-1576.
Meng, X, "Ultrashort pulse OPO ring laser", in CLEO 2000, technical digest, vol. CMW7 Lasers and Electro-Optics Conference, (2000), 122.
Meng, Xianmei, et al., "Intracavity pumped optical parametric oscillator bidirectional ring laser as a differential interferometer", Optics Communications, vol. 233(1-3), (2004), 167-172.
Nisoli, M., "Compression of high-energy laser pulses below 5 fs", Optics Letters vol. 22, No. 8, (Apr. 15, 1997), 522-524.
Paulus, G. G, et al., "Measurement of the Phase of Few-Cycle Laser Pulses", Physical Letter Review vol. 91, No. 25, (Dec. 2003), 253004: 1-4.
Schenkel, B, et al., "Generation of 3.8-fs pulses from adaptive compression of a cascaded hollow fiber supercontinuum", Optics Letters vol. 28, No. 20, (Oct. 2003), 1987-1989.
Schmidt, O, et al., "Steep dispersion and group velocity below c/3000 in coherent population trapping", Phys. Rev. A 53, Issue 1, (Jan. 1996), R27-R30.
Smid, R, et al., "Precise Length etalon controlled by stabilized frequency comb", Measurement Science Review vol. 8, Sec 3, No. 5, (2008), 114-117.
Spielmann, Christian, et al., "Ultrabroadband Femtosecond Lasers", IEEE Journal of Quantum Electronics vol. 30, No. 4, (Apr. 1994), 1100-1114.
Steinmetz, Tilo, et al., "Laser Frequency Combs fr Astronomical Observations", (Sep. 2008), 18 pgs.
Thorpe, Michael J, et al., "Broadband Cavity Ringdown Spectroscopy for Sensitive and Rapid Molecular Detection", Science vol. 311, (Mar. 2006), 1595-1599.
Udem, TH., et al., "Accurate measurement of large optical frequency differences with a mode-locked laser", Optics Letters vol. 24, No. 13, (Jul. 1999), 881-883.
Ye, Jun, et al., "Femtosecond Optical Frequency Comb: Principle, Operation, and Applications", Kluwer Academic Publishers / Springer, (2005), 370 pgs.

* cited by examiner

INJECT OPTICAL OUTPUT FROM A DRIVE LASER INTO A SLAVE LASER
510

ADJUST ONE OR MORE PARAMETERS OF THE DRIVE LASER AND/OR THE SLAVE LASER SUCH THAT A FREQUENCY COMB IS GENERATED FROM THE SLAVE LASER
520

FIG. 5

RECORD REPETITION RATES OF A DRIVE LASER AND A SLAVE LASER, WITH EACH OF THE LASERS OPERATING INDEPENDENTLY
610

MULTIPLY ELECTRONICALLY THE REPETITION RATE OF THE DRIVE LASER BY THE FACTOR K
620

MULTIPLY ELECTRONICALLY THE REPETITION RATE OF THE SLAVE LASER BY THE FACTOR K – 1
630

MAKE ADJUSTMENTS TO ONE OR BOTH OF THE DRIVE LASER AND THE SLAVE LASER SUCH THAT THE LASERS OPERATE AT ESSENTIALLY EQUAL FREQUENCIES
640

INJECT OPTICAL OUTPUT FROM THE DRIVE LASER INTO THE SLAVE LASER
650

CONTROL ONE OR MORE OF THE PARAMETERS OF THE SLAVE LASER SUCH THAT A FREQUENCY COMB IS GENERATED FROM THE SLAVE LASER
660

FIG. 6

SYSTEMS AND METHODS HAVING A FREQUENCY COMB

RELATED APPLICATION

This application claims priority under 35 U.S.C. 119(e) from U.S. Provisional Application Ser. No. 61/206,801, filed 4 Feb. 2009, which application is incorporated herein by reference in its entirety.

FIELD OF THE INVENTION

The invention relates generally to frequency combs and to systems and devices for the generation and/or use of the same.

BACKGROUND

Mode-locked lasers can provide accurate frequency combs. An optical frequency comb is an optical spectrum of equidistant lines. The use of frequency combs as a tool may depend on the spacing between teeth of the comb being sufficiently large for a given application. A proposed method to increase tooth spacing has included the use of a Fabry-Perot cavity to multiplex the pulse train of a mode-locked laser. The shortcomings of this method are threefold. First, because the device is a passive device, the average power is reduced. Second, because of the unavoidable cavity dispersion, the unequal spacing of the Fabry-Perot modes defeat the purpose of a comb of absolute accuracy. Even when the cavity is in vacuum, there will be dispersion due to the minor changes. Finally, matching the carrier-to-envelope offset (CEO) of the driving laser and slave cavity is an unsolved problem. The CEO is an important parameter of pulse trains related to the change in phase from pulse to pulse in the train.

BRIEF DESCRIPTION OF THE FIGURES

Embodiments of the invention are illustrated by way of example and not limitation in the figures of the accompanying drawings in which.

DESCRIPTION

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a frequency comb with relatively large spacing can be generated using active devices. Elements of embodiments detailed below include an active (laser) cavity rather than a passive Fabry-Perot cavity. In various embodiments, two lasers of slightly different cavity lengths and dispersion with the same carrier-to-frequency offset can be used. The latter can be determined by the difference in phase and group velocity. In various embodiments, an additional Kerr medium can be used in a slaved cavity with a product of nonlinear index and length being K being times larger than that of the driving cavity. In various embodiments, the number K is equal to the ratio of peak pulse intensities at the nonlinear element in the driving and slaved cavities.

Accurate optical frequency standards over the complete visible/near-IR spectrum may provide significant contribution to a number of technology fields, such as, but not limited to astronomy. In various embodiments, frequency combs of mode-locked lasers can be used as tools in such applications, where the spacing between teeth of a frequency comb is sufficiently large enough to be resolvable by measurement tools. In an embodiment, the spacing between teeth of a frequency comb can be made sufficiently large enough to be resolvable by conventional optical means, such as, but not limited to, a grating and interference filters. The intensity can be reasonably high in each mode, and rigorously constant, to allow for heterodyne detection of signals and to determine the amplitude and frequency of the signals. The heterodyne detection can be used in applications, such as, but not limited to, heterodyne detection of signals from stars, where the reasonably high intensity can be used to determine the amplitude and frequency of the signal from stars. The largest frequency comb issued directly from a mode-locked laser corresponds to a ring cavity of 10 cm perimeter, which corresponds to a 3 GHz cavity. A minimum tooth spacing of 30 GHz would be desirable.

An "ideal" mode-locked laser can emit a train of identical pulses, at equal time interval. The period of the pulse train is $\tau_{RT}$, defined as the separation between two successive envelopes. In the particular case that the pulse separation is an integer number of optical cycles $\tau_{RT}=NT=N/\nu$ (T being the light period and $\nu=\omega/(2\pi)$ the optical frequency) the successive pulses are identical. This will generally not be the case, and there will be a phase shift $\phi_p=\omega\tau_{RT}\neq 2N\pi$ between successive pulses. The complex electric field of the total pulse train $\tilde{E}_{pt}$ is:

$$\tilde{E}_{pt}(t)=e^{i\omega t}[\tilde{\epsilon}(t)+\tilde{\epsilon}(t-\tau_{RT})e^{i\phi_p}+\tilde{\epsilon}(t-2\tau_{RT})e^{2i\phi_p}+\ldots] \quad (1)$$

where $\tilde{\epsilon}(t)=\epsilon(t)e^{i\phi_e}$ is the electric field of one particular pulse. The $n^{th}$ pulse has the phase factor exp $[i(\phi_e+n\phi_p)]$, different from the previous and next pulse. To the change in phase between successive pulses $\phi_p$, corresponds a frequency:

$$f_0 = \frac{1}{2\pi}\frac{\varphi_p}{\tau_{RT}}. \quad (2)$$

This frequency is called the carrier-to-envelope offset (CEO). The CEO is an important parameter of pulse trains, where the change in phase from pulse to pulse is a measurable quantity, independent of the duration of the individual pulse in the train.

Figure 1A:
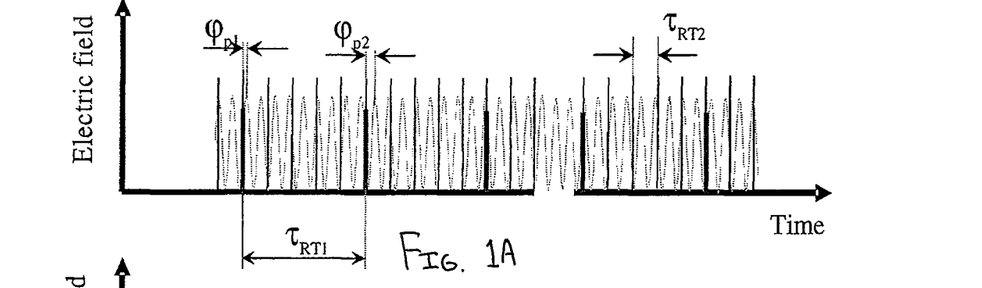
FIG. 1A shows an idealized infinite train of δ-function pulses.
Figure 1B:
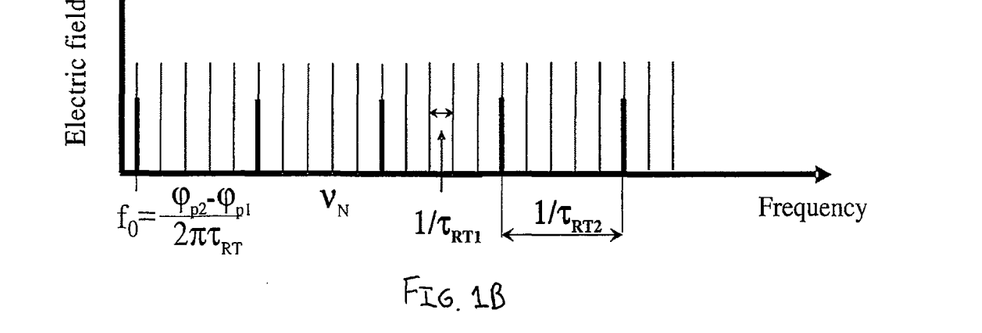
FIG. 1B shows the Fourier transform of the idealized infinite train of FIG. 1A.

FIG. 1A shows an idealized infinite train of δ-function pulses and FIG. 1B shows its Fourier transform. The drive laser used in this example embodiment has a pulse period of $\tau_{RT1}$ and the multiplexed pulse train in this drawing has a period $\tau_{RT2}=\tau_{RT1}/5$. One can "idealize," to the extreme, the concept of a pulse train, by considering an infinite train of δ-functions, equally spaced by the period of the train $\tau_{RT}$, as shown in FIG. 1A. The Fourier transform of this ideal pulse train shown in FIG. 1B is an identical picture in the frequency domain: a comb of infinite extent (because the pulses were delta-function in time), with δ-function teeth (because of the infinite extent of the train). Since the comb extends to infinity, there is no particular tooth that can be called an average frequency. Each mode $\nu_m$ of index m carries the same weight and corresponds, in the time domain, to an infinite sine wave, which is a particular term of a Fourier series representation of δ-function. The first tooth at frequency $\nu_0 = f_0$ represents the CEO defined above. The corresponding carrier-to-envelope phase, $\phi_e$ defined previously, can be identified in the time domain, even with a train of δ-functions. The harmonic wave corresponding to the mode $\nu_2$ is shown in FIG. 1A, and the phase $\phi_p$ is identified as the phase at which each δ-function crosses the harmonic field. This harmonic wave sketched is associated with $\nu_2$ because there are two periods between pulses. In the Fourier spectrum of a train of δ-functions, any mode $\nu_n$ can be chosen as being the "average frequency". From FIGS. 1A and 1B, it can be determined that two parameters have to be matched to generate the multiplexed pulse train: the pulse trains should have the same carrier-to-envelope frequency $f_0$ and the repetition rates should be in an integer ratio.

Figure 2A:
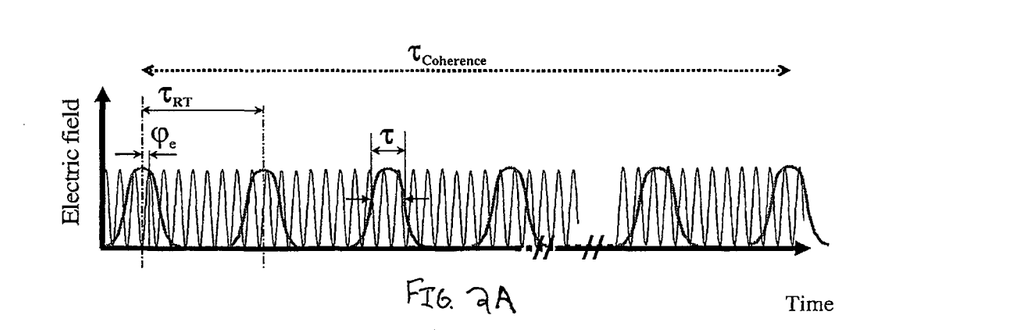
FIG. 2A shows a finite train of pulses of finite duration t, where the successive pulse envelope repeats every $\tau_{RT}$.
Figure 2B:
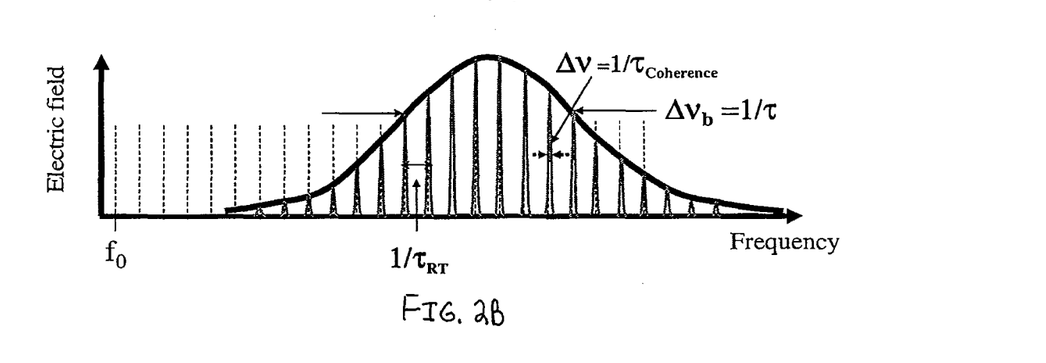
FIG. 2B shows the Fourier transform of the pulse train shown in FIG. 2A.

FIG. 2A shows a finite train of pulses of finite duration t, where the successive pulse envelope repeats every $\tau_{RT}$. Within the coherence time of the train, $\tau_{Coherence}$, the same carrier at the optical frequency is modulated by the successive envelopes. FIG. 2B shows the Fourier transform of the pulse train shown in FIG. 1A. A somewhat more mundane train of pulses of finite duration τ is sketched in FIG. 2A. When not otherwise specified herein, the pulse duration will be taken as the Full Width at Half Maximum (FWHM) of the pulse intensity profile. In the frequency domain, shown in FIG. 2B, the infinite pulse train is represented by a finite frequency comb. The envelope of the comb is the Fourier transform of the envelope of a single pulse of the train, thus of extension≈1/τ. The teeth of the frequency comb are no longer δ-functions, but sharp peaks of width $1/\tau_c$, where $\tau_c$ is the coherence time of the pulse train. The carrier-to-envelope phase $\phi_p$ is indicated for a pulse of the time sequence in FIG. 2A. Note that this phase is changing from one pulse to the next. The rate of change $\phi_p/(2\pi\tau_{RT})$ is the frequency $f_0$, which is indicated in the frequency picture by the lowest frequency tooth of the extension (dashed lines in FIG. 2B). The angular frequency $\omega_m$ of the $m^{th}$ mode of the comb is given by:

$$\omega_m = 2\pi f_0 + m\frac{2\pi}{\tau_{RT}} \quad (3)$$

In the case of a train of pulses of finite duration, the frequency $f_0$ is no longer a real tooth of the comb, but the first mode of an extension of the frequency comb beyond the pulse bandwidth as shown in FIG. 2B.

It can be seen from this definition that $f_0$ is indeed the change of phase per round-trip between the envelope and the carrier. By definition of $\tau_{RT}$, the pulse envelope peaks exactly at the same locations after one round-trip. With respect to this envelope, the shift of phase of the mode m is obtained by multiplying Eq. (3) by $\tau_{RT}$:

$$\omega_m\tau_{RT} = 2\pi f_0\tau_{RT} + 2m\pi \quad (4)$$

which, after substitution of the definition of $f_0$ Eq. (2), is indeed the phase $\phi_p$ defined earlier.

In various embodiments, in order to multiplex the train, one laser, with the modes $f_{01}+m_1/\tau_{RT1}$, injects another laser which, if it were not injected, would create the mode comb $f_{02}+m_2/\tau_{RT2}$. The conditions to be fulfilled for the two lasers are $$f_{01} = f_{02}$$

$$\tau_{RT1}\tau_{RT2} = m_1 m_2 \quad (5)$$

The condition under which a laser emits a stable train of identical ultrashort pulses has been previously established. It has been shown that the condition that leads to the circulation of an ultrashort pulse of stable amplitude in an active laser cavity is the same that leads to a frequency comb of equally spaced teeth.

If a laser is to generate a pulse of well-defined duration and shape, there has to be compression and broadening mechanisms that balance each other and lead to a stable pulse. The mechanisms that lead to an emergence of a pulse out of noise in a laser cavity are usually dissipative, i.e., the pulse that emerges dissipates a minimum amount of energy by nonlinear loss mechanisms and extracts the maximum amount of gain from the active laser medium. Non-dissipative interaction that plays a dominant role for the stable formation of the shortest pulses can be considered here.

The physical reason for a non-zero CEO, $f_0$, is the dispersion of the laser cavity in which a pulse is circulating. The components of the laser cavity impose different group velocities on the pulse. An average group velocity, $v_g$, of the pulse envelope can be defined as $v_g = P/\tau_{RT}$, where P represents twice the length of a linear cavity or the perimeter of a ring cavity. This average group velocity is different from the phase velocity $c/n_{av}$, where $n_{av}$ is the linear index of refraction averaged over the laser components. The two quantities are related by:

$$\frac{1}{v_g} = \frac{n_{av}}{c} + \frac{\omega}{c}\frac{dn_{av}}{d\Omega}\bigg|_{\omega}. \quad (6)$$

Note that the quantities $n_{av}$ and $v_g$ are functions of the spectral frequency of the pulse. The "ideal mode-locked laser" considered in this section already poses a conceptual dilemma. Mode-locking is generally described as putting the modes of a laser cavity in phase. If the cavity has dispersion, it can be seen that the mode-comb issued from the laser does not start at zero frequency but with a frequency offset $f_0$. Keeping in mind that a cavity with dispersion has unequally spaced modes, is contradictory to the fact that the frequency comb has rigorously equally spaced teeth. To resolve this apparent contradiction, embodiments deal with the pulse train formation, and provide for a method of how an initially irregular set of modes can lead to an essentially perfect frequency comb.

As shown above, a minimum negative cavity dispersion $k_{av}''$ is required for stable mode-locked operation. Such a cavity dispersion implies that the index of refraction $n_{av}$ is frequency (wavelength) dependent, hence the spacing of the cavity modes $c/[n_{av}(\Omega)P]$ varies across the pulse spectrum.

The laser can be modeled by a circulating pulse, which enters a Kerr medium of thickness l, resulting in phase modulation at each passage, and a medium that represents the linear dispersive properties of the cavity. It can be assumed that the balance of gain and losses maintains a constant Gaussian shape for the envelope of the circulating pulse. At each passage through the cavity, the phase of the pulse is modified in the time domain through the Kerr effect, and in the frequency domain through dispersion. Consider first the modulation in the time domain:

$$\varphi(t) = -k_{NL}l_{Kerr} = -\frac{2\pi n_2 l_{Kerr}}{\lambda} I_0 e^{-2(t/\tau_G)^2} \quad (7)$$

where $\tau_G$ is the 1/e halfwidth of the pulse electric field envelope (the FWHM of the intensity is $\tau_p = \sqrt{(2\ln 2)}\tau_G$). Ignoring at this point the influence of dispersion (which will be introduced after Fourier transformation into the frequency domain), the pulse train issued from the laser can be represented by:

$$\sum_{q=0}^{\infty} \varepsilon(t-\tau_q) e^{iq\varphi(t-\tau_q)} e^{i\omega t} \quad (8)$$

where $\tau_q$ is the time of arrival of the center of gravity of the successive pulses. At this point $\tau_q$ is not set to any value. It is assumed here that at t=0, the first pulse is unmodulated. Using a parabolic approximation for the Gaussian intensity profile, the time dependent phase is:

$$\varphi(t-\tau_q) \approx \frac{4\pi n_2 I_0 l_{Kerr}}{\lambda}\left(\frac{t-\tau_q}{\tau_G}\right)^2 = a\left(\frac{t-\tau_q}{\tau_G}\right)^2. \quad (9)$$

The Fourier transform of the pulse train given by Eq. (8) is:

$$\varepsilon(\Delta\Omega)\left[\sum_{q=0}^{\infty} e^{i\Delta\Omega\tau_q} e^{iq\Delta\Omega^2 \tau_k^2}\right] \quad (10)$$

where $$\Delta\Omega = \Omega - \omega \quad (11)$$

$$\varepsilon(\Delta\Omega) = \frac{\varepsilon_0\sqrt{\pi\tau_G}}{\sqrt[4]{1+a^2}} \exp\left\{-\frac{\Delta\Omega^2 \tau_G^2}{4(1+a^2)}\right\}$$

$$\tau_k^2 = \frac{a\tau_G^2}{4(1+a^2)}.$$

The width of the Gaussian pulse spectrum, broadened by the Kerr effect, is the inverse of the characteristic time $\tau_k$. Dispersion can now be taken into account. The operation representing the dispersion of the cavity is a product of the spectral field by $\exp[-ik_{av}(\Delta\Omega)P]$, where $-k_{av}(\Delta\Omega)P$ is the phase change per round-trip. In the argument of $k_{av}$, the light frequency $\omega$ is taken as origin ($\Delta\Omega=0$) of the frequency scale.

The combined Kerr effect and dispersion, in the frequency domain, leads to the output spectral field:

$$\varepsilon_{out}(\Delta\Omega)P = \varepsilon(\Delta\Omega)\left[\sum_{q=0}^{\infty} e^{i\Delta\Omega\tau_q} e^{iq\Delta\Omega^2 \tau_k^2} e^{-iqk_{av}(\Delta\Omega)P}\right] \quad (12)$$

Expanding the wave vector $k_{av}(\Delta\Omega)$ in series, to second order:

$$k_{av}(\Delta\Omega)P = k_{av}(\Delta\Omega=0)P + \Delta\Omega k'_{av}P + \frac{\Delta\Omega^2}{2}k''_{av}P \quad (13)$$

$$= k_{av}(\Delta\Omega=0)P + \Delta\Omega\tau_{RT} + \frac{k''_{av}P}{2}\Delta\Omega^2,$$

where the derivatives $k_{av}'$ and $k_{av}''$ are calculated at the light frequency $\omega(\Delta\Omega=0)$. Note that $k_{av}'=1/v_g=\tau_{RT}/P$ [cf. Eq. (6)] are material properties independent of the index q, as is the cavity perimeter P. The modes of the cavity are not equally spaced. The parameter k" characterizes the departure from equal spacing. Substituting (13) in Eq. (12), $$\varepsilon_{out}(\Delta\Omega)P = \varepsilon(\Delta\Omega)\left[\sum_{q=0}^{\infty} e^{i\Delta\Omega(\tau_q-q\tau_{RT})} e^{iq\Delta\Omega^2(\tau_k^2-k''_{av}P/2)}\right]. \quad (14)$$

The conditions $$\tau_k^2 = -\frac{k''_{av}P}{2} \quad (15)$$

$$\tau_q = q\tau_{RT} \quad (16)$$

lead to modes that are exactly equally spaced. The inverse Fourier transform of the frequency comb then becomes:

$$\tilde{\varepsilon}_{out}(t) = \varepsilon(t) + \varepsilon(t-\tau_{RT})e^{-ik_{av0}P} + \varepsilon(t-2\tau_{RT})e^{-2ik_{av0}P} \ldots \quad (17)$$

This last equations corresponds indeed to the description of the ideal frequency comb, with equally spaced pulses in time and frequency, and a carrier-to-envelope phase shift of $\phi_p = -k_{av0}P$. In the case of small Kerr modulation, a<<1, one gets the approximation:

$$\tau_k^2 = \frac{a\tau_G^2}{4(1+a^2)} \approx \frac{4\pi n_2 I_0 l_{Kerr}\tau_G^2}{4\lambda} = \frac{k''_{av}P}{2} \quad (18)$$

This expression is useful in determining the parameters of the driving and slaved laser, such that synchronized operation is possible.

Figure 3:
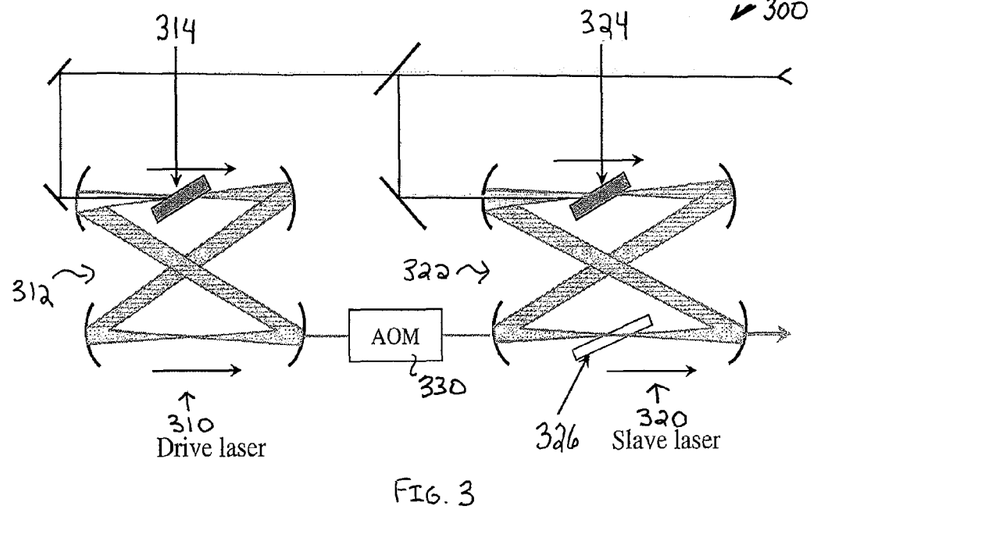
FIG. 3 shows an embodiment of an apparatus having a drive laser arranged to inject a slave laser from which a frequency comb is provided.

In an example embodiment, a device can be constructed according to the following design, which does not limit other appropriate designs or methods and materials from being used in creating alternative embodiments. FIG. 3 shows an apparatus 300 having a drive laser 310 and a slave laser 320 configured such that an optical output from drive laser 310 is injected into slave laser 320 to generate a frequency comb. The frequency comb can be provided from the output of slave 320. Drive laser 310 has a cavity 312 and gain medium 314. Slave laser 320 has a cavity 322 and gain medium 324. Various materials may be used for gain medium 314 and gain medium 324. In a non-limiting example embodiment, Ti:sapphire can be used as a gain medium. Drive laser 310 and slave laser 320 can be nearly identical using all negative dispersion mirrors to compensate for the dispersion of the mirror. Slave laser 320 is slightly longer and includes a nonlinear crystal 326 to provide a Kerr effect.

FIG. 3 shows that driver laser 310 of perimeter $P_1$ injects a slave laser of perimeter $P_2$. Driver laser 310 can have a repetition rate of $(1/\tau_{RT1})=v_{g1}/P_1$, where $v_{g1}$ is the group velocity in the driver cavity. Let $K\tau_{RT1}$ (where K is an integer) be the desired final mode spacing (repetition rate), then the chosen perimeter of slave laser 320 can be $P_2=(K+1)P_1/K$. For instance, a mode-locked Ti:sapphire laser can be constructed with an appropriate perimeter, such as approximately $P_1=10$ cm, corresponding to a repetition rate of an appropriate frequency, such as approximately 3 GHz. If, for example, a 30 GHz mode spacing is desired, the slave cavity can be chosen with a perimeter of 11 cm, corresponding to a repetition rate, when not injected by the first laser, of 2.727 GHz. The same negative dispersion minors can be used in both cavities 312 and 322.

Operated independently, the two lasers 310 and 320 can be characterized, that is, their repetition rates can be accurately measured as well as their carrier-to-envelope offset (CEO), pulse duration, and intensity. Both lasers 310 and 320, in this example, should have nearly equal ratio of group to phase round-trip time, hence nearly the same CEO, $f_{01}=f_{02}$. If not, adjustment of the pump power can be used to make these two parameters exactly equal. The group delay can be fine tuned by adjusting the power of the pump laser, with minimal change of phase delay.

From the characterization of lasers 310 and 320, all parameters of Eq. (18) are known for both lasers 310 and 320 operating independently. However, if slave laser 320 is injected by drive laser 310, it will be operating at K times higher repetition rate, hence the peak power of the pulses will be reduced by a factor K. In order to have slave laser 320 producing a frequency comb, Eq. (18) has to be effectively satisfied at the higher repetition rate. This is possible, for instance, if the factor $n_2 l_{Kerr}$ is increased by the same factor that the intensity $I_0$ is decreased. This can be achieved by the insertion of crystal 326 of material with a high nonlinear index at the second focus of slave cavity 322. In various embodiments, crystal 326 is composed of a material having a nonlinear index many times greater than the index of gain medium 324. The nonlinear index of crystal 326 may be 10, 20, 50, or some other number of times greater than the index of gain medium 324. In an embodiment, the nonlinear index of crystal 326 is at least 50 times greater than the index of gain medium 324 For example, ZnS may be used as crystal 326, where ZnS has a nonlinear index 50 times larger than that of Ti:sapphire. Use of ZnS can adequately compensate for the higher repetition rate. Other materials may be used for crystal 326. In addition, the inclination of crystal 326 can provide a fine tuning of the group to phase delay in cavity 322, hence a fine tuning of the CEO of slave laser 320.

Slave laser 320 can thus be adjusted to have the proper ratio of dispersion to Kerr effect for creating a frequency comb at K times the repetition rate of driving laser 310. To achieve an essentially perfect match between the two lasers, fine adjustment of the CEO of driving laser 310 can be achieved with control element 330 that can shift the frequency comb of driving laser 310 without affecting its repetition rate. Control element 330 can be realized as an acousto-optic modulator (AOM) 330, which can shift the frequency comb of the driving laser without affecting its repetition rate.

The frequency comb from drive laser 310 can be locked to any available optical standard. A narrow atomic line which serves as optical standard can be used for this purpose. "State of the art" techniques can be used to measure a beat note between the frequency standard. In various embodiments, the measured beat note can be used for stabilizing drive laser 310. There are also existing "state of the art" techniques to stabilize the carrier-to-envelope of drive laser 310.

In an embodiment, locking the slave laser to the drive laser can include use of electronic mechanisms. The cavity length of the slave laser can be approximately preset by electronic means. First, the repetition rates of the drive and slave lasers operating independently can be recorded by a fast detector, and multiplied electronically by the appropriate factor (K for the drive laser, K−1 for the slave laser). The length of the slave laser can be adjusted to have the two resulting frequencies exactly equal.

Next, output from the drive laser is injected into the slave laser, followed by making a match of the slave cavity parameters for the desired frequency comb. There are two errors signals to be recorded: (1) The amplitude frequency component to be eliminated; and (2) the amplitude noise of the pulse train generated by the combined lasers. The error signal (1) is a measure of the mismatch of both the repetition rate and the modes (CEO) of the slaved laser. A small error in repetition rate can cause a periodic fluctuation of this error signal. The period of this fluctuation can be made infinite by adjusting the slave cavity length with a piezoelectric-element. The residual amplitude of this error signal can be essentially eliminated by adjusting the carrier-to-envelope of the injected pulse train with, for example, an acousto-optic modulator as shown in FIG. 3.

The amplitude noise in the output pulse train is a manifestation that the condition (18) is not satisfied. Fine adjustments of the angle of the nonlinear element, such as crystal 326 in FIG. 3, can be made, which effectively changes the thickness of the element corresponding to adjusting l in Eq. (18). The pump power [$I_0$ in Eq. (18)] of the slaved laser can also be adjusted. These adjustments can be made to substantially reduce or eliminate the amplitude noise. Such adjustments can be automatically made using a feedback system.

It should be noted that a simultaneous electronic stabilization of all parameters may be implemented, because the controls are not orthogonal. Indeed, a change of pump power of a Ti:sapphire laser, for example, affects the group velocity in this gain medium, hence the laser repetition rate $1/\tau_{RT2}$. A tilt of the nonlinear crystal affects the CEO of the slave laser.

Figure 4:
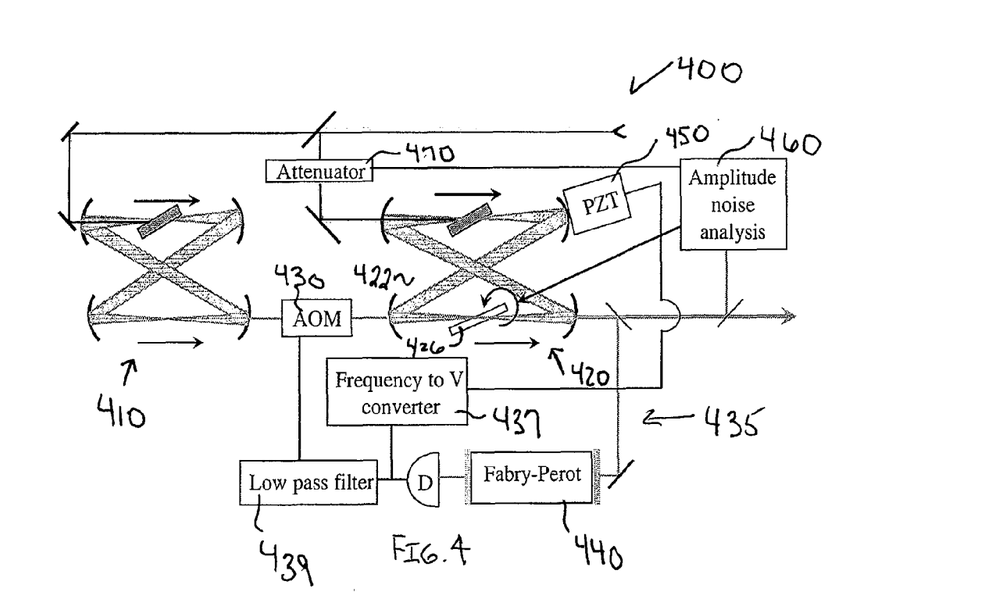
FIG. 4 shows a block diagram of an embodiment of an apparatus having a drive laser and a slave laser to generate a frequency comb including elements for stabilization.

FIG. 4 shows a block diagram of an embodiment of an apparatus having a drive laser 410 and a slave laser 420 to generate a frequency comb including elements for stabilization A high finesse Fabry-Perot device 440 selects a mode of drive laser 410 that will not be a mode from the final laser combination. The feedback system 435 minimizes the signal on the detector, D, 442 by tuning the repetition rate of the slave cavity 422 with a piezoelectric element 450 and by matching the CEO of the seeded combo with an AOM 430. Feedback system 435 can include a frequency to voltage converter 437 to provide control signals to piezoelectric element 450. Feedback system 435 can include a low pass filter 439 to provide a filtered electrical signal from the optical signal provided by Fabry-Perot device 440 from sampling the output of slave laser 420. Another portion of the beam output from slave laser 420 is sampled and directed to amplitude noise analysis unit 460 to analyze the amplitude noise, which can be minimized by control to the pump power, such as by using attenuator 470, and control the angle of the nonlinear element 426.

In various embodiments, a basic detection approach using a frequency comb can include mixing the weak signal under investigation with the laser signal and analyzing the radio-frequency spectrum of the detected current (heterodyne detection). Several options are possible, depending on the nature of the signals to be analyzed. If the signal to be analyzed consists off a few discrete lines, the complete received signal may be sent to the detector, and the various spectral lines identified with the different components of the electronic spectrum. An option can include using an optical filter or spectrometer to separate the spectral component of the signal to be analyzed before heterodyne detection. In another option, the total signal to be analyzed can be heterodyned with the complete frequency comb. The repetition of the frequency comb can be scanned, and the optical spectrum can be inferred from an analysis of the electronic spectrum versus repetition rate. The last technique assumes an automated slaving process of both lasers while the repetition rate of the first one is being scanned.

Figure 5:
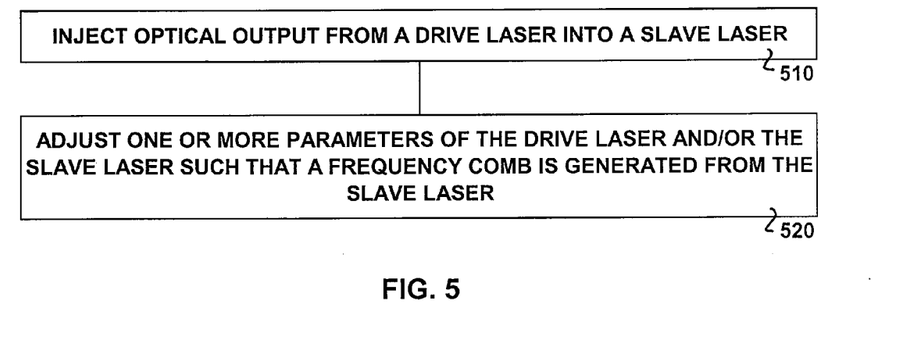
FIG. 5 shows features of a method to generate a frequency comb with selected spacing, according to various embodiments.

FIG. 5 shows features of a method to generate a frequency comb with selected spacing, according to various embodiments. At 510, optical output from a drive laser is injected into a slave laser. At 520, one or more parameters of the drive laser and/or the slave laser are adjusted such that a frequency comb is generated from the slave laser. The generated frequency comb can be at a multiple of the repetition rate of the drive laser. The multiple can be generated such that frequency spacing between lines of the frequency comb can be optically separated. The optical separation can be conducted using one or more conventional optical devices such as one or more interference films, a grating, or a spectrometer. Adjustment of one or more parameters can include making the carrier-to-envelope offset for the drive laser essentially equal to the carrier-to-envelope offset for the slave laser by adjusting power of a pump laser. Adjustment of one or more parameters can include fine tuning a group to phase delay in the slave laser by adjusting an inclination of a crystal located at a focus in the cavity of the slave laser, where the crystal has a nonlinear index of refraction. Adjustment of one or more parameters can include using an acousto-optic modulator to adjust a carrier-to-envelope offset for the drive laser such that a frequency comb of the driving laser is shifted essentially without affecting the driving laser's repetition rate. Adjustment of one or more parameters can include locking a frequency comb from the drive laser to an optical standard. The optical standard can include an atomic line.

The frequency comb from the slave laser can be used to make a measurement. The measurement can include measuring a parameter of an electromagnetic signal. An unknown frequency of the electromagnetic signal can be measured by measuring beat notes with respect to frequency comb. For example, the frequency comb can be used to detect a signal from a star.

Figure 6:
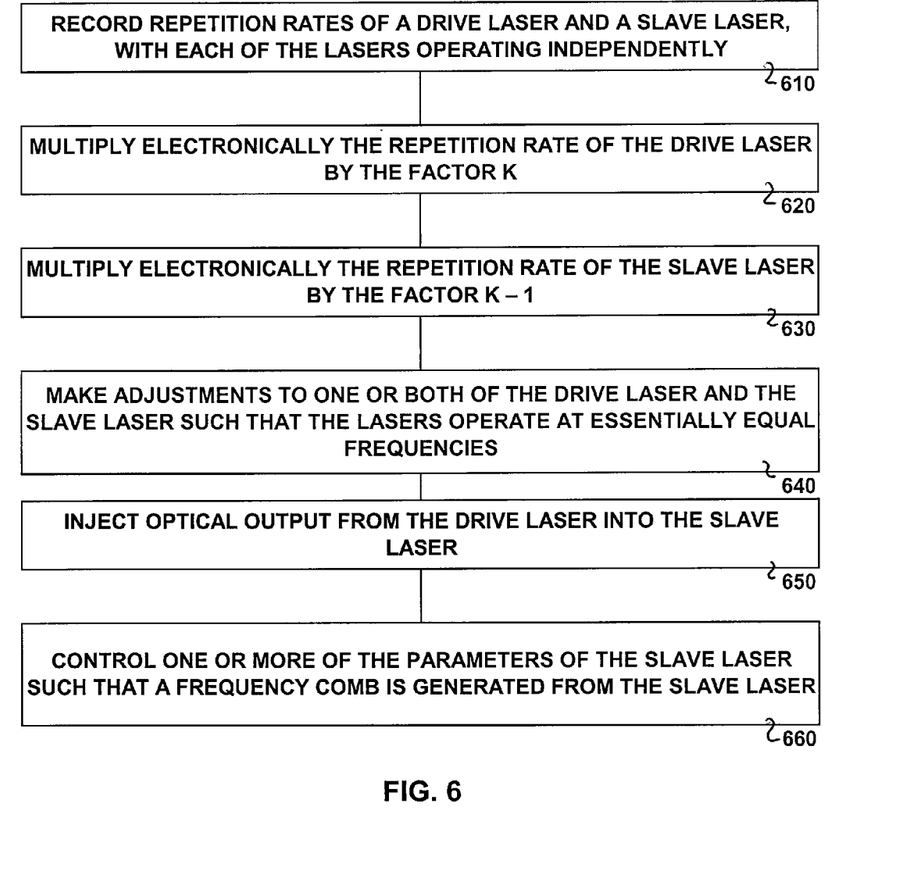
FIG. 6 shows features of a method to generate a frequency comb with selected spacing, according to various embodiments.

FIG. 6 shows features of a method to generate a frequency comb with selected spacing, according to various embodiments. At 610, repetition rates of a drive laser and a slave laser, each of the lasers operating independently, are recorded. A detector, converting an optical input to the detector to an electrical output from the detector, can be used in the determination of the repetition rates. At 620, the repetition rate of the drive laser is electronically multiplied by the factor K. At 630, the repetition rate of the slave laser is electronically multiplied by the factor K−1.

At 640, adjustments to one or both of the drive laser and the slave laser are made such that the lasers operate at essentially equal frequencies. The cavity length of the slave laser can be adjusted to effectively synchronize the two lasers. At 650, optical output from the drive laser is injected into the slave laser. At 660, one or more of the parameters of the slave laser are controlled such that a frequency comb is generated from the slave laser.

Generating the frequency comb can include recording an error signal that is a measure of mismatch of both repetition rate and modes of the slave laser, adjusting the cavity length of the slave laser with a piezoelectric-element to increase a period of fluctuation of the error signal, and adjusting a carrier-to-envelope of the output signal injected into the slave laser such that residual amplitude of the error signal after adjusting the cavity length is attenuated. The carrier-to-envelope of the output signal injected into the slave laser can be adjusted such that the residual amplitude is essentially eliminated.

Generating the frequency comb can include recording amplitude noise of a pulse train generated by combination of the drive laser and the slave laser and adjusting an angle of inclination of a nonlinear element in the cavity of the slave laser and/or adjusting pump power to the slave laser such that the amplitude noise is reduced. Generating the frequency comb can include essentially simultaneous electronic stabilization of parameters of the drive laser and the slave laser. Generating the frequency comb can include performing feedback operations such as directing a portion of a beam output from the slave laser to a Fabry-Perot cavity, selecting a mode of the drive laser using a Fabry-Perot cavity such that the selected mode will not be a mode generated from a laser combination of the drive laser and the slave laser, minimizing a signal on the detector that receives output from the Fabry-Perot cavity by tuning a repetition rate of the cavity of the slave laser with a piezoelectric element and matching a carrier-to-envelope offset of the laser combination with an acousto-optic modulator, sampling another portion of the beam to analyze amplitude noise, and controlling pump power to the slave laser and/or an angle of a nonlinear element in the cavity of the slave laser to minimize the amplitude noise.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:
1. A method comprising:
injecting optical output from a drive laser into a slave laser, the drive laser and the slave laser being mode-locked lasers; and
adjusting one or more parameters of the drive laser and/or the slave laser such that a frequency comb is generated from the slave laser, the frequency comb being at a multiple of the repetition rate of the drive laser, wherein adjusting one or more parameters includes fine tuning a group to phase delay in the slave laser, the slave laser having a cavity, by adjusting an inclination of a crystal located at a focus in the cavity of the slave laser, the crystal having a nonlinear index of refraction.

2. The method of claim 1, wherein the multiple is generated such that frequency spacing between lines of the frequency comb can be optically separated.

3. The method of claim 2, wherein optical separation is conducted using one or more optical devices selected from one or more interference films, a grating, or a spectrometer.

4. The method of claim 1, wherein adjusting one or more parameters includes making a carrier-to-envelope offset for the drive laser essentially equal to a carrier-to-envelope offset for the slave laser by adjusting power of a pump laser.

5. A method comprising:
injecting optical output from a drive laser into a slave laser; and
adjusting one or more parameters of the drive laser and/or the slave laser such that a frequency comb is generated from the slave laser, the frequency comb being at a multiple of the repetition rate of the drive laser, wherein adjusting one or more parameters includes fine tuning a group to phase delay in the slave laser, the slave laser having a cavity, by adjusting an inclination of a crystal located at a focus in the cavity of the slave laser, the crystal having a nonlinear index of refraction.

6. The method of claim 5, wherein adjusting the inclination of the crystal includes adjusting an inclination of a ZnS crystal located at the focus in the cavity of the slave laser.

7. The method of claim 1, wherein adjusting one or more parameters includes using an acousto-optic modulator to adjust a carrier-to-envelope offset for the drive laser such that a frequency comb of the driving laser is shifted essentially without affecting the driving laser's repetition rate.

8. The method of claim 1, wherein adjusting one or more parameters includes locking a frequency comb from the drive laser to an optical standard.

9. The method of claim 1, wherein locking a frequency comb from the drive laser to an optical standard includes locking a frequency comb from the drive laser to an atomic line.

10. The method of claim 1, wherein the method includes using the frequency comb to make a measurement.

11. The method of claim 10, wherein using the frequency comb to make a measurement includes measuring a parameter of an electromagnetic signal.

12. The method of claim 11, wherein using the frequency comb to make a measurement includes measuring an unknown frequency of the electromagnetic signal by measuring beat notes with respect to frequency comb.

13. The method of claim 10, wherein using the frequency comb to make a measurement includes using the frequency comb to detect a signal from a star.

14. The method of claim 1, wherein the nonlinear index of refraction of the crystal is at least 50 times greater than an index of refraction of a gain medium of the slave laser.

15. The method of claim 1, wherein adjusting the inclination of the crystal includes adjusting an inclination of a ZnS crystal located at the focus in the cavity of the slave laser.

16. A method comprising:
recording repetition rates of a drive laser and a slave laser, the drive laser and the slave laser being mode-locked lasers, each of the lasers operating independently, each laser having a cavity and a cavity length;
multiplying electronically the repetition rate of the drive laser by a factor K and multiplying electronically the repetition rate of the slave laser by a factor K−1;
making adjustments to one or both of the drive laser and the slave laser such that the lasers operate at essentially equal frequencies;
injecting optical output from the drive laser into the slave laser; and
controlling one or more of the parameters of the slave cavity such that a frequency comb is generated from the slave laser, the frequency comb being at a multiple of the repetition rate of the drive laser, wherein controlling one or more parameters includes fine tuning a group to phase delay in the slave laser by adjusting an inclination of a crystal located at a focus in the cavity of the slave laser, the crystal having a nonlinear index of refraction.

17. The method of claim 16, wherein recording repetition rates includes using a detector converting an optical input the detector to an electrical output from the detector.

18. The method of claim 16, wherein making adjustments to one or both of the drive laser and the slave laser includes adjusting the cavity length of the slave laser.

19. The method of claim 16, wherein the method includes:
recording an error signal that is a measure of mismatch of both repetition rate and modes of the slave laser;
adjusting the cavity length of the slave laser with a piezoelectric-element to increase a period of fluctuation of the error signal; and
adjusting a carrier-to-envelope offset of the output signal injected into the slave laser such that residual amplitude of the error signal after adjusting the cavity length is attenuated.

20. The method of claim 19, wherein adjusting the carrier-to-envelope offset of the output signal injected into the slave laser includes adjusting the carrier-to-envelope offset of the output signal injected into the slave laser such that the residual amplitude is essentially eliminated.

21. The method of claim 16, wherein the method includes:
recording amplitude noise of a pulse train generated by combination of the drive laser and the slave laser; and
adjusting an angle of inclination of a nonlinear element in the cavity of the slave laser and/or adjusting pump power to the slave laser such that the amplitude noise is reduced.

22. The method of claim 16, wherein the method includes essentially simultaneous electronic stabilization of parameters of the drive laser and the slave laser.

23. The method of claim 16, wherein the method includes directing a portion of a beam output from the slave laser to a Fabry-Perot cavity;
selecting a mode of the drive laser using a Fabry-Perot cavity such that the selected mode will not be a mode generated from a laser combination of the drive laser and the slave laser;
minimizing a signal on the detector that receives output from the Fabry-Perot cavity by tuning a repetition rate of the cavity of the slave laser with a piezoelectric element and matching a carrier-to-envelope offset of the laser combination with an acousto-optic modulator;
sampling another portion of the beam to analyze amplitude noise; and
controlling pump power to the slave laser and/or an angle of a nonlinear element in the cavity of the slave laser to minimize the amplitude noise.

* * * * *